United States Patent [19]

Inamatsu et al.

[11] Patent Number: 5,527,751
[45] Date of Patent: Jun. 18, 1996

[54] POLYMERIZATION CATALYST AND METHOD FOR PRODUCING POLYOLEFIN OR OLEFIN BLOCK COPOLYMER USING THE SAME

[75] Inventors: Kunihiro Inamatsu; Tsuyoshi Matsumoto, both of Ichihara; Kazuo Soga, Yokohama, all of Japan

[73] Assignee: Maruzen Petrochemical Co., Ltd., Tokyo, Japan

[21] Appl. No.: 266,390

[22] Filed: Jun. 27, 1994

[30] Foreign Application Priority Data

Jun. 29, 1993 [JP] Japan .................................. 5-182099
Jun. 29, 1993 [JP] Japan .................................. 5-182100
Apr. 22, 1994 [JP] Japan .................................. 6-106283

[51] Int. Cl.$^6$ .............................. C08F 4/52; C08F 10/00
[52] U.S. Cl. .................... 502/117; 526/140; 526/141; 526/142; 526/152; 526/153; 526/160; 526/348.4; 526/352; 525/269; 525/299
[58] Field of Search .................... 526/160, 151; 502/117

[56] References Cited

U.S. PATENT DOCUMENTS

| 5,066,739 | 11/1991 | Pettijohn et al. | 526/160 |
| 5,091,352 | 2/1992 | Kioka et al. | 526/160 |
| 5,109,085 | 4/1992 | Pettijohn et al. | 526/160 |
| 5,218,064 | 6/1993 | Yasuda et al. | 526/160 |
| 5,232,999 | 8/1993 | Conroy et al. | 526/160 |
| 5,244,991 | 9/1993 | Geerts | 526/160 |

FOREIGN PATENT DOCUMENTS

| 220436 | 2/1959 | Australia | 526/160 |

*Primary Examiner*—Edward J. Smith
*Attorney, Agent, or Firm*—Oblon, Spivak, McClelland, Maier & Neustadt

[57] ABSTRACT

A polymerization catalyst comprising a reaction product of an organic rare earth metal compound of the formula (I), $$Cp_a Lx_b M_c D_d \qquad (I)$$

(wherein in the formula (I), Cp is a substituted or unsubstituted cyclopentadienyl group, indenyl group, fluorenyl group or their derivatives, or a multidentate coordination compound residue obtained by bonding these groups by way of hydrocarbon or silicon, L is a metal selected from the group consisting of elements having an atomic number of 39 and 57–71, X is a halogen atom, M is an alkaline metal or alkaline earth metal, D is an electron donor, a is 1–2, b is 1–2, c is 0–1, and d is 0–3) with a Grignard reagent of the formula (II), $$RMgX \qquad (II)$$

wherein in the formula (II), R is a hydrocarbon group, and X is a halogen atom); a method for producing a polyolefin or an olefin block copolymer by using the above-mentioned catalyst; and an olefin block copolymer produced by the above-mentioned method.

4 Claims, 2 Drawing Sheets

POLYMERIZATION CATALYST AND METHOD FOR PRODUCING POLYOLEFIN OR OLEFIN BLOCK COPOLYMER USING THE SAME

BACKGROUND OF THE INVENTION

1. Field of the Invention

The present invention relates to a polymerization catalyst and a method for producing a polyolefin or an olefin block copolymer using the same. More particularly, the present invention relates to a method for producing a polyolefin or an olefin block copolymer by using an organic rare earth metal compound system catalyst having a high activity and an activity of long duration, which is usable for producing a high molecular polymer even at a high temperature. The present invention further relates to a novel olefin block copolymer obtained by block-polymerizing an olefin with an unsaturated carboxylic acid ester (hereinafter referred to as "unsaturated carboxylate"), and more particularly, the present invention relates to a novel olefin block copolymer obtained by block-polymerizing an olefin polymer block with a (meth)acrylate polymer block having a highly isotactic structure.

2. Discussion of Background

Heretofore, a Ziegler system catalyst has been widely used as a polymerization catalyst for olefins. However, when an olefin is subjected to copolymerization with a monomer having a polar group in the presence of a Ziegler system catalyst, the Ziegler system catalyst is highly reactive with a compound having a polar group and the catalyst is deactivated so that the copolymerization can not be satisfactorily conducted.

Recently, an organic rare earth metal compound system catalyst has been proposed as a uniform system catalyst for olefin polymerization. Particularly, it is reported that a catalyst having a cyclopentadiene derivative as a ligand has a high activity for polymerization of olefin, and that this catalyst or a combination of this catalyst with an organic aluminum compound can be applied to copolymerization of a monomer having a polar group (see Japanese Unexamined Patent Publications No. 255116/1991 and No. 53813/1992), but these catalysts have disadvantages that their catalytic activity and duration of activity are not satisfactory and that they are inconvenient to handle.

For example, U.S. Pat. No. 4,668,773 discloses an organic lanthanide compound of the formula $Cp_2'MR$ (wherein $Cp_2'$ is $[\eta^5\text{-}(CH_3)_5C_5]_2$, M is a lanthanide element, and R is a bistrimethylsilylmethyl group or the like), and its hydrogenated hydride compound $(Cp_2'MH)_2$, and also discloses that these compounds, particularly hydride system compounds are useful as an ultra-highly active catalyst for a uniform system olefin polymerization. However, this catalyst must be prepared immediately before using in polymerization since this catalyst is very unstable and is hard to be preserved even in a strict nitrogen atmosphere. Moreover, the activity maintenance of this catalyst is low, and many steps are required for preparing this catalyst. Also, this catalyst is expensive since it is hard to synthesize a silyl group-substituted alkyl group which is a starting material for preparing this catalyst.

Recently, the catalyst system consisting of a compound of $Cp_nMX_{4-n}M'L_x$ (wherein Cp is cyclopentadienyl or cyclopentadienyl substituted with an alkyl or alkylsilyl radical, M is a metal having an atomic number in the range of 58 to 71, M' is an alkali metal, L is a suitable electron donor ligand, X is a halogen, n is 1 or 2, and x is a number in the range of 1 to 3) and an alkyl metal such as BuLi and $R_2Mg$ has been disclosed in U.S. Pat. No. 5,109,085, but the above U.S. patent does not mention the polymerization of alkyl-(meth)acrylate at all. The catalyst system of this prior art can not provide a satisfactory isotactic polymer.

Moreover, it has been reported that the lanthanide metal complexes having alkylcyclopentadienyl ligands afford rather syndiotactic polymethylmethacrylate in homopolymerization and copolymerization with ethylene (for example, H. Yasuda et al, Macromolecules, 25, 5115 (1992)).

The present inventors have studied and found a novel polymerization catalyst comprising a reaction product of an organic rare earth metal compound of specific structure with a Grignard reagent, which does not have the above-mentioned disadvantages of the conventional catalysts. The catalyst of the present invention has a high catalytic activity, an activity of long duration and an ability to cause living polymerization to olefins and polar monomers, and is suitable for polymerizing or copolymerizing olefins. Also, a block copolymer of olefin can be satisfactorily prepared by introducing a polar monomer such as a (meth)acrylate monomer in the presence of the catalyst of the present invention after conducting polymerization of olefin for a predetermined time, and it has been found that the olefin-(meth)acrylate block copolymer thus obtained is a novel block copolymer having a highly isotactic structure as compared with the conventionally known olefin(meth)acrylate block copolymer.

The catalyst system of the above cited U.S. Pat. No. 5,109,085 is essentially different from the catalyst system of the present invention since the former catalyst employs an alkyl lithium or a dialkyl magnesium as a co-catalyst, whereas the latter catalyst employs an alkyl magnesium halide. The catalyst of this prior art can not provide a satisfactory isotactic copolymer, but rather provides a copolymer being rich in syndiotactic structure. On the other hand, the catalyst of the present invention can provide a satisfactory highly isotactic polymer which is the desired product of the present invention. As to the homopolymerization of ethylene, also, the catalyst of the present invention has the characteristic that it brings less transfer reaction at a high temperature (e.g. 70°–80° C.), thus providing a higher molecular weight, which is favorable for industrial use, whereas the catalyst of this prior art brings more transfer reaction at a high temperature and provides a lower molecular weight.

SUMMARY OF THE INVENTION

Figure 1:
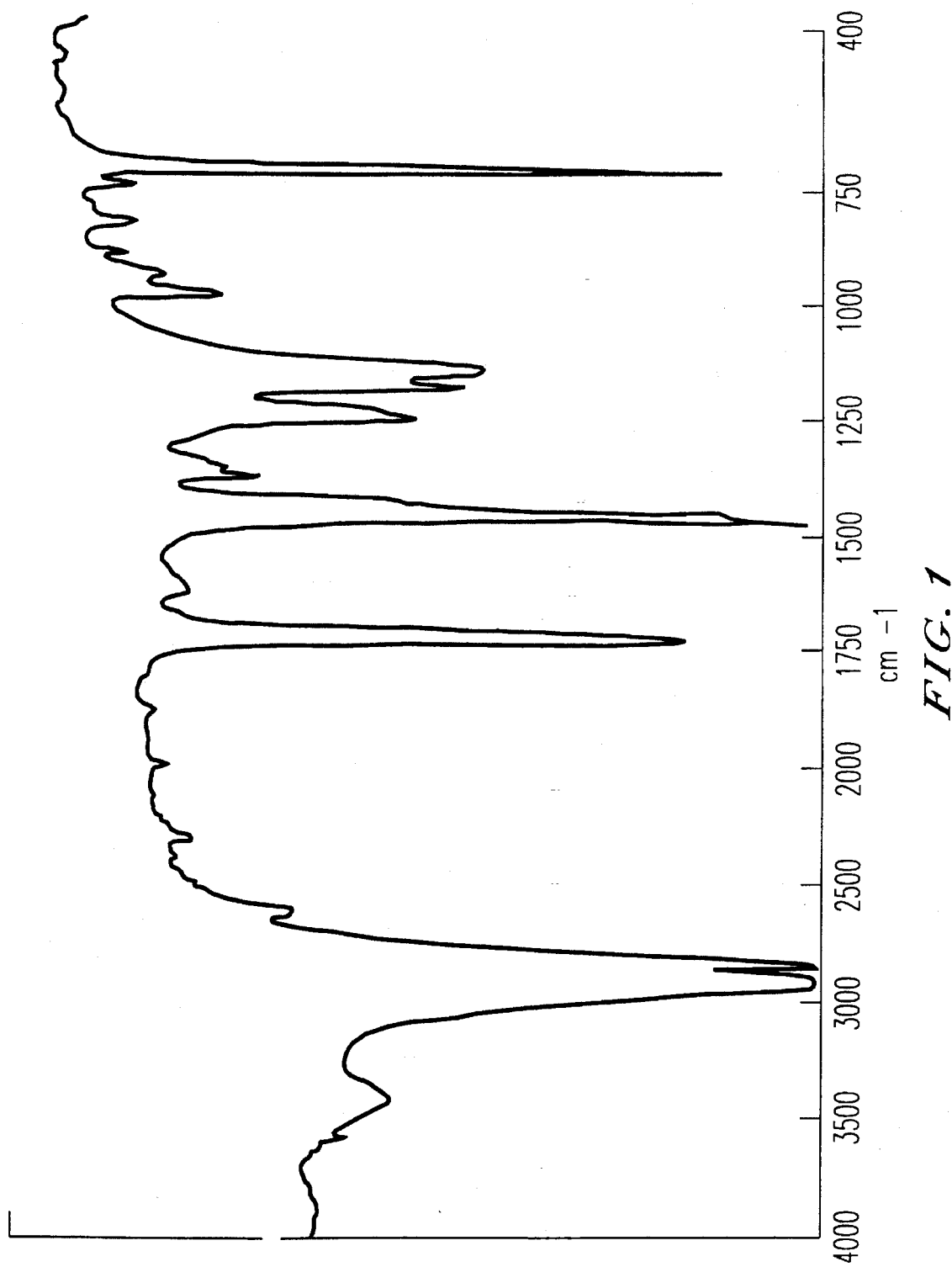
FIG. 1 illustrates an infrared absorption spectrum of an olefin block copolymer of the present invention.

The present invention relates to a polymerization catalyst comprising a reaction product of an organic rare earth metal compound of the formula (I), $$CpLx_bM_cD_d \qquad (I)$$

(wherein in the formula (I), Cp is a substituted or unsubstituted cyclopentadienyl group, indenyl group, fluorenyl group or their derivatives, or a multidentate coordination compound residue obtained by bonding these groups by way of hydrocarbon or silicon, L is a metal selected from the group consisting of elements having an atomic number of 39 and 57–71, X is a halogen atom, M is an alkaline metal or alkaline earth metal, D is an electron donor, a is 1–2, b is 1–2, c is 0–1, and d is 0–3) with a Grignard reagent of the formula (II),

RMgX　　　　　　　　　　　　　　　　(II)

(wherein in the formula (II), R is a hydrocarbon group, and X is a halogen atom).

The present invention further relates to a method for producing a polyolefin, which comprises polymerizing or copolymerizing an α-olefin in the presence of the above-mentioned polymerization catalyst.

The present invention further relates to a method for producing a polyolefin, which comprises polymerizing or copolymerizing an α-olefin in the presence of the above-mentioned polymerization catalyst additionally containing an organic aluminum compound as a co-catalyst.

The present invention further relates to a method for producing an olefin block copolymer, which comprises copolymerizing at least one α-olefin with at least one unsaturated carboxylate in the presence of the above-mentioned polymerization catalyst.

The present invention further relates to a method for producing an olefin block copolymer, which comprises copolymerizing at least one α-olefin with at least one unsaturated carboxylate in the presence of the above-mentioned polymerization catalyst additionally containing a trialkylaluminum as a promoter.

The present invention further relates to an olefin block copolymer having a weight average molecular weight of at least 500 obtained by block-polymerizing α-olefin polymer segment A with (meth)acrylate polymer segment B, wherein the (meth)acrylate polymer content is from 0.01 to 90% by weight and the isotactic content of the segment B is at least 95% as measured by $^{13}$C-NMR spectrum analysis of carbonyl group carbon of the (meth)acrylate polymer.

DETAILED DESCRIPTION OF THE INVENTION

In the formula (I), Cp constituting an organic rare earth metal compound of the polymerization catalyst of the present invention, is a substituted or unsubstituted cyclopentadienyl group, indenyl group, fluorenyl group or their derivatives, or a multidentate coordination compound residue obtained by bonding these groups by way of hydrocarbon or silicon, and examples of the derivatives include a hydride, an alkyl-substituted material, an aryl-substituted material, a silyl-substituted material and the like, more particularly a cyclopentadienyl group, a pentamethylcyclopentadienyl group, an indenyl group, and a ditrimethylsilylcyclopentadienyl group.

Also, at least two of these substituted or unsubstituted cyclopentadienyl or condensed cyclopentadienyl groups may be bonded by way of hydrocarbon or silicon to provide a multidentate coordination compound. Examples of the hydrocarbon or silicon group which bonds these substituents, include a $C_{1-4}$ alkylene group, an aryl-substituted alkylene group, an alkyl-substituted silylene group and the like, preferably a methylene group, an ethylene group, a propylene group and a dimethylsilyl group.

The rare earth metal (L) constituting the organic rare earth metal compound is a metal selected from the group consisting of elements having an atomic number of 39 and 57–71, preferable examples of which include yttrium, lanthanum, cerium, praseodymium, neodymium, samarium, ytterbium and lutetium.

X is a halogen element, preferably chlorine, bromine or iodine.

The organic rare earth metal compound contains the above-mentioned Cp, L and X as the essential components, and may also contain an alkaline metal or alkaline earth metal (M) and an electron donor (D) as optional components.

Examples of the alkaline metal or alkaline earth metal (M) include lithium, sodium, potassium, magnesium and the like. Examples of the electron donor (D) include ethers such as diethyl ether, furans such as tetrahydrofuran, amines such as N,N,N,N-tetramethylenediamine, phosphines, pyridines and the like, preferably diethyl ether and tetrahydrofuran.

Examples of such organic rare earth metal compound (I) include biscyclopentadienylsamarium chloride, bispentamethylcyclopentadienylytterbium chloride, bispentamethylcyclopentadienylneodymium dichloride lithium, bispentamethylcyclopentadienylneodymium dichloride sodium, bispentamethylcyclopentadienylneodymium dichloride potassium, ethylenebisindenyllutetium chloride, dimethylsilylenebisditrimethylsilylcyclopentadienylyttrium dichloride lithium, and their etherates and tetrahydrofuranates.

The above-mentioned organic rare earth metal compound (I) can be synthesized by a known method. Thus, it can be obtained by reacting a rare earth metal halide with an alkaline metal compound having a cyclopentadienyl or condensed cyclopentadienyl ring group in an ether type organic solvent such as tetrahydrofuran or diethyl ether. For example, pentamethylcyclopentadienylneodymium dichloride lithium diethyl etherate can be obtained by refluxing neodymium trichloride and pentamethylcyclopentadienyl lithium in tetrahydrofuran and purifying the product. The organic rare earth metal compound may be used without purifying.

In the present invention, a reaction product of the above-mentioned organic rare earth metal compound (I) with a Grignard reagent is used as an olefin polymerization catalyst. The Grignard reagent is represented by the formula RMgX (II) wherein R is a hydrocarbon group and X is a halogen element. Examples of the hydrocarbon group include an alkyl group, an aryl group, an alkenyl group and the like, preferably a $C_{1-6}$ alkyl group such as methyl, ethyl, n-propyl, t-butyl, i-amyl and n-hexyl, a $C_{6-9}$ aryl group such as phenyl, p-methyl phenyl, m-methyl phenyl, dimethyl phenyl, trimethyl phenyl and ethyl phenyl, and a $C_{2-4}$ alkenyl group such as vinyl, allyl, 2-methylallyl and crotyl. Examples of the halogen element include preferably chlorine, bromine and iodine.

The mixing ratio of the organic rare earth metal compound with the Grignard reagent varies depending on the type of the organic rare earth metal compound, but the Grignard reagent is used generally in an amount of from 0.01 to 100 mols, preferably from 0.1 to 10 mols per mol of the organic rare earth metal compound. The reaction is conducted at a temperature of from −100° C. to 200° C. usually in an ether solvent. The reaction product is generally soluble in an aromatic hydrocarbon solvent even if the organic rare earth metal compound and the Grignard reagent are respectively insoluble in the aromatic hydrocarbon solvent, and it is considered that a new complex having a catalytic function is formed by the reaction of the organic rare earth metal compound with the Grignard reagent although its structure is not clear.

The organic rare earth metal complex thus obtained may be used alone, but may also be used in the form of being supported on an inorganic carrier such as a metal chloride and a metal oxide or a polymer carrier such as polyethylene.

The reaction product of the above organic rare earth metal compound with the Grignard reagent may be used alone as an olefin polymerization catalyst, and may also be used together with an organic aluminum compound as a co-catalyst which further improves the catalytic activity. Examples of the organic aluminum compound used as a co-catalyst include trimethylaluminum, triethylaluminum, triisopropylaluminum, triisobutylaluminum, trihexylaluminum, trioctylaluminum, diethylaluminum chloride, ethylaluminum sesquichloride and the like. The organic aluminum compound is used in an amount corresponding to from 0 to 20 mols of aluminum per mol of rare earth metal element. At least two types of organic aluminum compounds may be used in a mixture.

A reaction product obtained by reacting the organic rare earth metal compound with the organic aluminum compound such as trialkylaluminum without reacting with the Grignard reagent, does not have a high polymerization catalytic activity.

The present invention is applicable to polymerization or copolymerization reaction of α-olefin, or to block copolymerization reaction of α-olefin with at least one unsaturated carboxylate. Examples of the α-olefin include a $C_{2-10}$ olefin such as ethylene, propylene, butene and 4-methylpentene, and among them, ethylene is most preferable.

Examples of the copolymerization reaction of the α-olefin include copolymerizations of ethylene with propylene, ethylene with butene, ethylene with pentene, ethylene with hexene, ethylene with nonene, ethylene with decene, ethylene with 4-methylpentene, and the like.

The catalyst of the present invention is used also for block copolymerization of an α-olefin with an unsaturated carboxylate, for example, block copolymerization of an ethylene-propylene copolymer with an unsaturated carboxylate.

Examples of the unsaturated carboxylate to be block-copolymerized with the α-olefin include an alkyl ester of an unsaturated carboxylic acid such as acrylic acid, methacrylic acid, ethylacrylic acid, propylacrylic acid or butylacrylic acid. Examples of the alkyl group of the alkyl ester include methyl, ethyl, n-propyl, i-propyl, n-butyl, s-butyl, t-butyl, vinyl, allyl, 2-methylallyl, 2-(dimethylamino), 2-methoxyethyl, cyclohexyl, 2-chloroethyl or ethylene glycol group, and particularly preferable examples of the unsaturated carboxylate include methyl acrylate, ethyl acrylate, methylmethacrylate or ethylmethacrylate.

The olefin block copolymer of the present invention is obtained by conducting the first stage polymerization of α-olefin in the presence of the above-mentioned catalyst until a predetermined amount of an olefin polymer is formed, stopping supplying the α-olefin and charging an unsaturated carboxylate in place of the α-olefin to conduct the second stage polymerization. The catalyst of the present invention still has a catalytic activity even after the first stage olefin polymerization, and has a function of living polymerization to produce a block copolymer by block-polymerizing the above formed olefin polymer with an unsaturated carboxylate monomer supplied in place of the α-olefin. Generally, the polymerization of the unsaturated carboxylate becomes harder proportionally as the molecular weight of the olefin segment becomes larger.

Generally, polymerization or copolymerization of an α-olefin as well as block-copolymerization of an α-olefin with an unsaturated carboxylate can be conducted in any form of solution, suspension, slurry or gas phase, and when it is conducted in a solvent, an inert organic solvent is used. Examples of the solvent include aliphatic hydrocarbons such as pentane, hexane and heptane, aromatic hydrocarbons such as benzene, toluene and xylene, and cycloaliphatic hydrocarbons such as cyclopentane, cyclohexane and methylcyclohexane. The polymerization can be conducted continuously in at least two polymerization vessels.

The polymerization temperature may vary depending on the type of the catalyst used, and the type and properties of the aimed polymer, but is generally from 0° C. to 200° C. The polymerization can be conducted by any of continuous process or batch-wise process. The polymerization pressure generally ranges from normal pressure to 100 kg/cm² (gauge pressure).

The polymerization is conducted in an inert atmosphere, but the olefin polymerization may be conducted generally in the presence of a chain transfer agent to control a molecular weight. Examples of the chain transfer agent include hydrogen, alkyl zinc and the like.

A polymer obtained in the present invention is separated from a solvent and then from a catalyst by an appropriate method, and is washed and dried to obtain a final product. Since the catalyst is highly active and the amount of the catalyst used is very small, the operation to remove the catalyst may be omitted.

The total molecular weight of the block copolymer obtained by the method of the present invention and the molecular weight of each of the olefin polymer segment and the unsaturated carboxylate polymer segment can be appropriately controlled by adjusting a polymerization time and polymerization conditions of each stage, but the proportion of the molecular weight of the unsaturated carboxylate polymer segment is generally from 0.01 to 99.9%, preferably from 0.01 to 50%, to the total molecular weight.

The polymerization reaction product sometimes contains polymers of an olefin and an unsaturated carboxylate in addition to the block copolymer, and they can be separated by solvent extraction. When separating a homopolymer of an unsaturated carboxylate, it can be separated by extracting with an organic solvent such as chloroform.

The block copolymer of the present invention can be subjected to gel permeation chromatography (GPC) and nuclear magnetic resonance (NMR) analysis to evaluate a total molecular weight, a molecular weight distribution, a molecular weight of each polymer segment, a proportion of the unsaturated carboxylated polymer segment, and the like.

The olefin block copolymer of the present invention is obtained by block-copolymerizing α-olefin polymer segment A with (meth)acrylate polymer segment B, and has a total weight average molecular weight of at least 500, preferably from 1,000 to 1,000,000.

Examples of α-olefin constituting the segment A include a $C_{2-10}$ α-olefin such as ethylene, propylene, butene and 4-methylpentene, and a preferable α-olefin is ethylene. The segment A may be an α-olefin copolymer such as an ethylene-propylene copolymer, and the copolymer may be a random copolymer or an olefin block copolymer of an ethylene polymer and a propylene polymer.

The (meth)acrylate polymer content in the olefin block copolymer is generally from 0.01 to 90% by weight, preferably from 0.1 to 80% by weight. The total molecular weight of the block copolymer and the (meth)acrylate polymer content can optionally be controlled by adjusting polymerization conditions including a polymerization time and a polymerization temperature of each stage.

The isotactic olefin block copolymer of the present invention is characterized in that the (meth)acrylate polymer segment B has a stereoregularity, and has a highly isotactic structure. The steric structure of the isotactic (meth)acrylate polymer can be identified by $^{13}$C-NMR.

For example, in the case of polymethylmethacrylate (PMMA), the polymerization unit of a polymer has five carbon atoms marked with (a) to (e) as illustrated below.

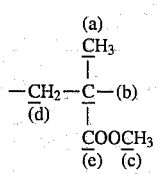

When isotactic PMMA is analyzed by $^{13}$C-NMR under such conditions as defined in the following Examples, the following signals attributed to these carbon atoms are recognized.

22.9 ppm (a)

46.5 ppm (b)

51.3 ppm (c)

53.0 ppm (d) and 176.3 ppm (e)

Also, in the case of an olefin/MMA block copolymer, the above-mentioned respective signals strongly appear and other signals due to PMMA segment are very weak if the PMMA segment is highly isotactic, and the high isotactic content of the PMMA segment in the block copolymer can be recognized in this manner.

The carbonyl group carbon atom (e) of an isotactic polyMMA shows a signal at 176.3 ppm, and it is a sharp one peak based on mmmm pentad sequence. On the other hand, a polymer comprising a mixture of atactic and syndiotactic structures shows some peaks at 177.5 ppm, at 176.6 ppm, at 177.3 ppm, etc. based on other pentad sequences in the vicinity of 176.3 ppm, and does not show one sharp peak. According to $^{13}$C-NMR spectrum analysis, the block copolymer of the present invention shows a strong one signal (at 176.3 ppm in the case of MMA) based on the mmmm sequence of the carbonyl group carbon, and signals based on other pentad sequences are very weak. This means that the block copolymer of the present invention is an olefin block copolymer having a highly isotactic poly(meth)acrylate.

The isotactic content of the segment B can be determined from the peak area ratio in the $^{13}$C-NMR spectrum in accordance with the following formula.

Isotactic content=$S_{mmmm}/\Sigma S_{pt}$ wherein $S_{mmmm}$: peak area based on mmmm sequence $\Sigma S_{pt}$: total peak areas based on the pentad sequences The $^{13}$C-NMR analysis for determining the above-mentioned isotactic content is conducted under conditions of spectral frequency for $^{13}$C measurement=100 MHz, number of scans=20,000 to 30,000 times, and pulse repetition rate= 10 seconds.

The isotactic content of the segment B of the block copolymer of the present invention determined in this manner is at least 95%.

In the case of a (meth)acrylate polymer having a methyl group carbon atom (a), an isotactic polymer shows a signal of the carbon atom (a) based on mm sequence, i.e. isotactic triad sequence (at 22.9 ppm in the case of PMMA, when analyzed under such conditions as defined in the following Examples). On the other hand, PMMA comprising a mixture of atactic and syndiotactic structures shows signals at 20.1 ppm and at 18.4 ppm based on mr and rr sequences. Thus, the block copolymer having the polymethylmethacrylate segment of the present invention is characterized in that signals at 20.1 ppm and at 18.4 ppm are very weak, and this means that the (meth)acrylate polymer block of the block copolymer of the present invention has a highly isotactic structure.

The block copolymer of the present invention is a modified polyolefin having a polar group at the terminal, and has improved coloring property and adhesive property as compared with an olefin homopolymer. Thus, it is useful as a compatibilizer, and useful for providing antistatic plastic, adhesive property-improved polyolefin resin, printing property-improved polyolefin resin and the like. Also, the copolymer of the present invention has unique properties since the (meth)acrylate polymer segment has a highly isotactic structure. That is, since the isotactic sequence achieves active segment action even if it is a long sequence, the isotactic polymer of the present invention provides a satisfactory compatibility with other high molecular weight compounds and a satisfactory solubility in a solvent. Thus, the isotactic polymer of the present invention achieves various excellent effects by blending with various polymers optionally selected from a wide range, for example, as a compatibilizer between a polyolefin and various polar polymers or as a modifier for improving water resistance of the surface of a polar polymer by blending therewith. Also, when the isotactic block copolymer of the present invention is used as a compatibilizer to impart an adhesive property to a polyolefin, it provides a resin having not only a satisfactory mechanical property based on the polyolefin and but also an excellent adhesive property based on the polar polymer.

The olefin-isostatic poly(meth)acrylate block copolymer of the present invention has the following advantages in respect of physical properties and functions as compared with an olefin-syndiotactic poly(meth)acrylate block copolymer.

Glass transition temperature (Tg) of isotactic poly(meth)acrylate is generally lower than that of syndiotactic or atactic (mr) poly(meth)acrylate. For example, Tg of isotactic polymethylmethacrylate is about 41° C. and that of syndiotactic one is 124° C.–141° C. depending upon its molecular weight, and that of atactic (mr) one is about 92° C. A polymer of lower Tg exhibits more rapid motion of its segment than that of higher Tg. This will result in that olefin-isostatic poly(meth)acrylate is such a compatibilizer as is more efficient and can be used for a wider range of polar polymer than a copolymer containing (meth)acrylate segment of other sterospecificity. Solubility and reactivity in solution, also, are higher in the case of isotactic poly(meth)acrylate than syndiotactic one. This originates from shorter spin-lattice relaxization time. Olefin-isotactic poly(meth)acrylate block polymer will have a surface more reactive with chemicals.

In the preparation of the block copolymer having a highly isotactic structure of the present invention, it is important to use the reaction product of the above-mentioned organic rare earth metal compound with the Grignard reagent as a polymerization catalyst. The block copolymer having a satisfactory highly isotactic structure in the segment B of the present invention can not be obtained when other organic metal compounds such as a dialkylmagnesium are used in place of the Grignard reagent in this polymerization catalyst system.

Now, the present invention will be described in further detail with reference to Examples. However, it should be understood that the present invention is by no means restricted to such specific Examples.

EXAMPLE 1

Synthesis of catalyst

Pentamethylcyclopentadienyl lithium (0.034 mol) and anhydrous neodymium trichloride (0.017 mol) were charged in a 300 ml flask with a stirrer, fully flushed with nitrogen. About 180 ml of dry tetrahydrofuran was added thereto, and the mixture was refluxed for about 12 hours. After removing tetrahydrofuran under reduced pressure, the reaction product was extracted with 120 ml of dry diethyl ether. The extraction operation was repeated twice. The extract was concentrated to about 100 ml, and was then subjected to decantation after cooling to −10° C. The product was then washed with about 10 ml of dry diethyl ether, and was dried under reduced pressure to obtain $Cp^*_2NdCl_2Li(ether)_2$ (wherein CP* represents a pentamethylcyclopentadienyl group).

The above prepared $Cp^*_2NdCl_2Li(ether)_2$ (1 mmol) and about 100 ml of dry diethyl ether were charged in a 200 ml flask fully flushed with nitrogen. After cooling with ice water, 0.5 ml (1 mol) of n-BuMgCl diethyl ether solution (2.0 mol/l) was dropwise added thereto, and the mixture was stirred for one hour. After preserving in a refrigerator for one night, diethyl ether was fully removed at room temperature under reduced pressure, and 100 ml of dry toluene was added thereto to obtain a catalyst (Catalyst A).

Polymerization 50 ml of dry toluene was charged in a 100 ml autoclave with a stirrer, fully dried and flushed with nitrogen, and the autoclave was then flushed with ethylene. After raising a temperature to 80° C., 5 ml (0.05 mmol) of the above prepared catalyst solution was added thereto, while continuously supplying ethylene, and polymerization was conducted under a pressure of 0.3 kg/cm$^2$ (gage pressure). The rate of ethylene absorption was 0.05 l/min at the stage of 5 minutes after the initiation of polymerization, 0.04 l/min at the stage of 10 minutes after the initiation of polymerization and 0.04 l/min at the stage of 15 minutes after the initiation of polymerization. The reaction solution was poured into methanol/hydrochloric acid at the stage of 15 minutes after the intimation of polymerization to precipitate a polymer. The polymer thus precipitated was separated by filtration, and was washed with methanol and dried to obtain 772 mg of white fine powdery polyethylene. The polyethylene thus obtained was subjected to GPC (temperature: 135° C., solvent: trichlorobenzene, molecular weight: calculation on polystyrene basis) to measure a molecular weight (Mw) and a molecular weight distribution (Mw/Mn). The type of the catalyst and the polymerization conditions are shown in the following Table 1, and the physical properties of the polyethylene thus obtained are shown in the following Table 2.

EXAMPLE 2

The same procedure as in Example 1 was repeated, except that 1 ml (0.01 mmol) of the catalyst solution of Example 1 was used and polymerization was conducted for 1 hour. As this result, 419 mg of polyethylene was obtained, and the polyethylene thus obtained had a higher molecular weight of 110,000 measured by GPC due to the longer polymerization time. The results are shown in the following Tables 1 and 2.

EXAMPLE 3

Polymerization of ethylene was conducted in the same manner as in Example 1, except that 2.5 ml (0.025 mmol) of triethylaluminum/toluene solution was added to 5 ml (0.05 mmol) of the catalyst solution of Example 1. The rate of ethylene absorption was 0.06 l/min at the stage of 5 minutes after the initiation of polymerization, 0.06 l/min at the stage of 10 minutes after the initiation of polymerization and 0.05 l/min at the stage of 15 minutes after the initiation of polymerization. As this result, 1012 mg of white fine powdery polyethylene was obtained. The results are shown in the following Tables 1 and 2.

EXAMPLE 4

A catalyst (Catalyst B) was prepared in the same manner as in Example 1, except that 0.25 ml (0.5 mol) of n-BuMgCl/diethyl ether solution (2.0 mol/l) was dropwise added to make n-BuMgCl/Nd complex molar ratio=0.5. Polymerization of ethylene was conducted by adding triethylaluminum/toluene solution to the above prepared catalyst B in the same manner as in Example 3. The rate of ethylene absorption was 0.04 l/min at the stage of 5 minutes after the initiation of polymerization, 0.03 l/min at the stage of 10 minutes after the initiation of polymerization and 0.03 l/min at the stage of 15 minutes after the initiation of polymerization. In this manner, 610 mg of polyethylene was obtained. The results are shown in the following Tables 1 and 2.

EXAMPLE 5

50 ml of dry toluene was charged in a 100 ml autoclave with a stirrer fully dried and flushed with nitrogen, and 5 ml (0.05 mmol) of the catalyst solution of Example 1 was added thereto. Thereafter, 0.5 ml of 4-methylpentene-1 was added thereto, while continuously supplying ethylene, to conduct polymerization at a pressure of 4 kg/cm$^2$ for 5 minutes. After finishing the polymerization, the reaction solution was poured into methanol/hydrochloric acid to precipitate a polymer. The polymer thus precipitated was separated by filtration, and was washed with methanol and dried to obtain 896 mg of white fine powdery polymer. The results are shown in the following Tables 1 and 2.

COMPARATIVE EXAMPLE 1

Polymerization of ethylene was conducted in the same manner as in Example 1, except that 0.05 mmol of $Cp^*_2NdCl_2Li(ether)_2$ without reacting with the Grignard reagent was used as a catalyst, but a polymer could not be obtained. The results are shown in the following Tables 1 and 2.

COMPARATIVE EXAMPLE 2

Polymerization of ethylene was conducted in the same manner as in Example 3, except that 0.025 mmol of triethylaluminum of Example 3 was added to 0.05 mmol of Cp*$_2$NdCl$_2$Li(ether)$_2$ of Comparative Example 1 (without reacting with the Grignard reagent), but only a trace amount of polyethylene could be obtained. The results are shown in the following Tables 1 and 2.

TABLE 1

| | Catalyst | Promoter | Al/Nd mol ratio | Monomer | Polymerization temp. (°C.) | Polymerization pressure (kg/cm$^2$) | Polymerization time (min) | Yield (mg) |
|---|---|---|---|---|---|---|---|---|
| Example 1 | A | — | — | Ethylene | 80 | | 15 | 772 |
| Example 2 | A | — | — | Ethylene | 80 | 0.3 | 60 | 419 |
| Example 3 | A | Et$_3$Al | 0.5 | Ethylene | 80 | 0.3 | 15 | 1012 |
| Example 4 | B | Et$_3$Al | 0.5 | Ethylene | 80 | 0.3 | 15 | 610 |
| Example 5 | A | — | — | E/4MP-1 | 80 | 4 | 5 | 896 |
| Comparative Example 1 | C | — | — | Ethylene | 80 | 0.3 | 15 | — |
| Comparative Example 2 | C | Et$_3$Al | 0.5 | Ethylene | 80 | 0.3 | 15 | — |

Catalyst A: n-BuMgCl/Cp*$_2$NdCl$_2$Li(OEt$_2$)$_2$ = 1
Catalyst B: n-BuMgCl/Cp*$_2$NdCl$_2$Li(OEt$_2$)$_2$ = 0.5
Catalyst C: Cp*$_2$NdCl$_2$Li(OEt$_2$)$_2$

TABLE 2

| | Mw | Mw/Mn |
|---|---|---|
| Example 1 | 65,500 | 2.46 |
| Example 2 | 110,000 | 2.21 |
| Example 3 | 29,200 | 1.86 |
| Example 4 | 40,100 | 2.67 |
| Example 5 | 88,300 | 2.34 |
| Comparative Example 1 | — | — |
| Comparative Example 2 | — | — |

As explained above, the organic rare earth metal compound system catalyst of the present invention exhibits a high activity and a high activity maintenance for polymerization or copolymerization of olefin, and exhibits a high activity also for polymerization at a high temperature. A polymer obtained thereby has a narrow molecular weight distribution and a high quality. Also, the catalyst of the present invention can be easily prepared, and the catalyst thus obtained is stable enough to be stored in an inert atmosphere for a long term, thus providing an industrially useful method for olefin polymerization.

EXAMPLE 6

Polymerization of ethylene 50 ml of dry toluene was charged in a 100 ml flask with a stirrer, fully dried and flushed with nitrogen, and the flask was further flushed with ethylene. After raising a temperature to 80° C., 5 ml (0.05 mmol) of the catalyst (Catalyst A) prepared in Example 1 was added thereto, and polymerization of ethylene was initiated at atmospheric pressure, while continuously supplying ethylene. After 15 minutes from the initiation of polymerization, the supply of ethylene was stopped, and the system was fully flushed with nitrogen. Thereafter, the flask was cooled to room temperature. In order to determine the properties of the polyethylene thus obtained, 5 ml of the content of the flask was placed in methanol/hydrochloric acid to precipitate a polymer, and the polymer thus precipitated was filtrated, washed and dried to obtain white fine powdery polyethylene. Before conducting block copolymerization, the polyethylene thus obtained was subjected to GPC (temperature: 135° C., solvent: trichlorobenzene, molecular weight: calculation on polystyrene basis) to measure a molecular weight (Mw) and a molecular weight distribution (MWD). The results are listed in Table 3.

Polymerization of MMA 2 ml of purified methylmethacrylate (MMA) was charged in the above flask where ethylene polymerization had been conducted, and block copolymerization was initiated at room temperature. After 2 hours, the reaction solution was poured into a large amount of methanol to stop polymerization and to precipitate a polymer. The polymer thus precipitated was filtrated, washed with methanol and dried under reduced pressure to measure its weight. The polymer thus obtained was extracted with chloroform in a Soxhlet apparatus for 4 hours, and the part insoluble in chloroform was taken out and dried to measure its weight. In this manner, 710 mg of white fine powdery ethylene/MMA block copolymer was obtained.

Analysis

The residue of the above extraction was 97.5%, and the amount of the component soluble in chloroform was very small. According to infrared absorption spectrum (IR) analysis, there was recognized no absorption to be assigned to PMMA. The component insoluble in chloroform was subjected to GPC, IR and $^{13}$C-NMR analyses. According to GPC analysis, the molecular weight was shifted to the higher molecular weight side due to copolymerization. According to IR analysis, there were recognized absorptions based on the polyethylene segment and the polymethylmethacrylate segment. The chloroform-insoluble component was extracted again in a Soxhlet apparatus, but the result of IR analysis showed no change. The IR spectrum is shown in FIG. 1.

The polymer was then dissolved in hot xylene, and the solution was poured into a large amount of chloroform to precipitate a polymer. The polymer thus precipitated was filtrated and dried, and was subjected to IR analysis. The result of the IR analysis was substantially the same as above, and showed no substantial change.

In order to determine the isotactic content of the segment B, the polymer was further subjected to $^{13}$C-NMR analysis.

The analysis apparatus and the analysis conditions used are as follows:

Apparatus: Nihon Denshi JNM-GSX400 type FTNMR analysis apparatus
Condition: Spectral frequency for $^{13}C$ measurement; 100MHz
Pulse width; 22.5 μs (90°)
Pulse repetition rate; 10 s
Number of scans; 25250
Proton decoupling mode; complete decoupling
Sample amount; 250 mg/10 φ sample tube
Solvent; o-dichlorobenzene d4(ODCBd4)
Temperature; 140° c.

Figure 2:
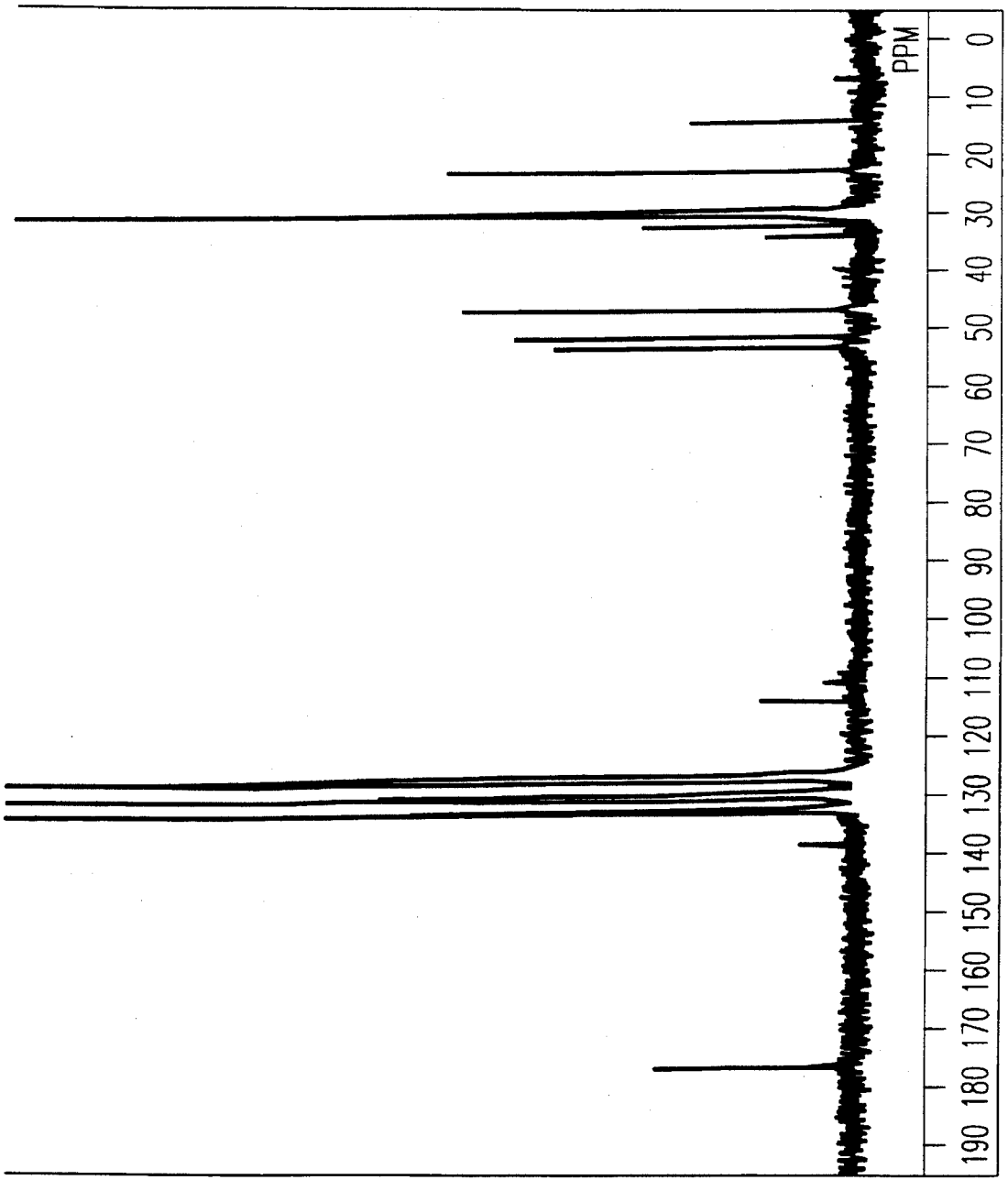
FIG. 2 illustrates a $^{13}$C-NMR spectrum of an olefin block copolymer of the present invention.

The result of the $^{13}C$-NMR analysis is shown in FIG. 2, wherein signals based on the following respective carbon atoms (a), (b), (c), (d) and (e) of the isotactic polymethylmethacrylate appeared respectively at 22.9 ppm (a), 46.5 ppm (b), 51.3 ppm (c), 53.0 ppm (d) and 176.3 ppm (e).

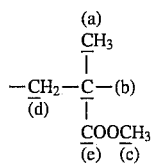

The signal appeared at 176.3 ppm was one strong peak based on the mmmm sequence of the carbonyl carbon atom, and there were recognized substantially no absorptions based on other pentad structures. The isotactic content determined from the area ratio of the peak based on the mmmm sequence of the carbonyl carbon atom was almost 100%.

There was a strong peak based on the isotactic methyl carbon atom (a) at 22.9 ppm, but there were observed no signals at 22.1 ppm and at 18.4 ppm based on atactic and syndiotactic structures.

The block copolymerization conditions are shown in the following Table 3, and the properties of the block copolymer thus obtained are shown in the following Table 4, together with the properties of polyethylene before charging methylmethacrylate monomer. The $^{13}C$-NMR spectrum is shown in FIG. 2.

EXAMPLE 7

Polymerization of ethylene was conducted in the same manner as in Example 6, except that 2.5 ml (0.025 mmol) of triethylaluminum/toluene solution was added after raising a temperature to 80° C. After 15 minutes from the initiation of polymerization, the supply of ethylene was stopped, and polymerization of MMA was conducted and the product was treated in the same manner as in Example 6 to obtain 920 mg of an ethylene/MMA block copolymer. With regard to the component soluble in chloroform, there was recognized an absorption based on polymethylmethacrylate was recognized. The component insoluble in chloroform was subjected to IR analysis, and peaks based on polyethylene and polymethylmethacrylate were recognized. According to $^{13}C$-NMR analysis conducted under the same conditions as in Example 6, the isotactic content of the polymethylmethacrylate segment was almost 100%. The results are shown in the following Tables 3 and 4.

EXAMPLE 8

A catalyst was prepared in the same manner as in Example 4, and 2.5 ml (0.025 mmol) of triethylaluminum/toluene solution was added thereto in the same manner as in Example 7. Block copolymerization of ethylene and MMA was conducted by using the above prepared catalyst system to obtain 529 mg of a block copolymer. According to IR analysis, an absorption based on polymethylmethacrylate was recognized with regard to the component soluble in chloroform. With regard to the component insoluble in chloroform, peaks based on polyethylene and polymethylmethacrylate were respectively recognized. According to $^{13}C$-NMR analysis conducted under the same conditions as in Example 6, the isotactic content of polymethylmethacrylate segment was almost 100%.

EXAMPLE 9

Polymerization of ethylene was conducted by using the catalyst of Example 1 in the same manner as in Example 6, except that polymerization time was made 10 minutes, and MMA was then block-copolymerized and the product was treated in the same manner as in Example 6 to obtain 492 mg of an ethylene/MMA block copolymer. The remaining proportion after extraction with chloroform was 98.2%, and the component insoluble in chloroform was subjected to GPC, $^{13}C$-NMR and IR analyses. According to the $^{13}C$-NMR analysis, MMA content was 25.0%. Also, according to the $^{13}C$-NMR conducted under the same condition as in Example 6, the isotactic content of the polyMMA segment was almost 100%. The results are shown in the following Tables 3 and 4.

Also, differential scanning calorimeter (DSC) analysis was done with the block copolymer. The block copolymer showed endothermic absorption peaks at 41.1° C. and 129.4° C., the former being attributed to the glass-transition of the isotactic polymethylmethacrylate segment and the latter to the melting of the polyethylene unit.

TABLE 3

| | Catalyst | Promoter | Al/Nd mol ratio | Ethylene polymerization | | MMA Polymerization | | Yield (mg) | Remaining proportion after extraction (%) |
| --- | --- | --- | --- | --- | --- | --- | --- | --- | --- |
| | | | | temp. (°C.) | time (min) | temp. (°C.) | time (hr) | | |
| Example 6 | A | — | — | 80 | 15 | Room temp. | 2 | 710 | 97.5 |
| Example 7 | A | Et₃Al | 0.5 | 80 | 15 | Room | 2 | 920 | 97.5 |

TABLE 3-continued

|  | Catalyst | Promoter | Al/Nd mol ratio | Ethylene polymerization temp. (°C.) | time (min) | MMA Polymerization temp. (°C.) | time (hr) | Yield (mg) | Remaining proportion after extraction (%) |
|---|---|---|---|---|---|---|---|---|---|
| Example 8 | B | Et₃Al | 0.5 | 80 | 15 | Room temp. | 2 | 529 | 97.7 |
| Example 9 | A | — | — | 80 | 10 | Room temp. | 2 | 492 | 98.2 |

TABLE 4

| | Molecular weight of GPC analysis | | | | ¹³C-NMR analysis | |
|---|---|---|---|---|---|---|
| | PE (Sampled before introducing MMA) | | Block copolymer (remained after extraction with CHCl₃) | | PolyMMA content | Isotactic content of polyMMA segment |
| | Mw | MWD | MW | MWD | (wt %) | (%) |
| Example 6 | 65,500 | 2.46 | 68,900 | 2.10 | 9.6 | 100 |
| Example 7 | 29,100 | 1.86 | 31,000 | 1.58 | 6.2 | 100 |
| Example 8 | 40,100 | 2.67 | 42,600 | 2.25 | 7.3 | 100 |
| Example 9 | 43,200 | 1.56 | 51,900 | 1.73 | 25.0 | 100 |

The olefin block copolymer thus obtained in accordance with the present invention, has a polar group chain joining the polyolefin, and has improved coloring property and adhesive property. Thus, the olefin block copolymer of the present invention is useful as a compatibilizer and also useful for providing antistatic plastic, adhesive property-improved polyolefin resin, printing property-improved polyolefin resin and the like. The olefin block copolymer of the present invention is useful particularly as a compatibilizer and for providing an adhesive polymer since it has the poly(meth)acrylate segment having a highly isotactic structure, which provides excellent properties in respect of compatibility with other polymers and solubility in a solvent, as compared with other ordinary olefin-(meth)acrylate block copolymers.

As mentioned above, the olefin block copolymer of the present invention can be easily prepared by using the above-mentioned specific organic rare earth metal compound system catalyst.

What is claimed is:

1. A polymerization catalyst comprising a reaction product of an organic rare earth metal compound with a Grignard reagent of the formula, RMgX, in an amount of from 0.1 to 10 mols per mol of the organic rare earth metal compound, wherein the organic rare earth metal compound is a compound selected from the group consisting of biscyclopentadienylisamarium chloride, bispentamethylcyclopentadienylytterbium chloride, bispentamethylcyclopentadienylneodYmium dichloride lithium, bispentamethylcyclopentadienylneodYmium dichloride sodium, bispentamethylcyclopentadienyl-neodymium dichloride potassium, ethylenebisindenyllutetium chloride, dimethylsilylenebisditrimethylsilylcyclopentaidienyl-yttrium dichloride lithium, and their etherates and tetrahydrofuranates, in the formula of the Grignard reagent, R is a hydrocarbon group selected from the group consisting of a $C_{1-6}$ alkyl group, a $C_{6-9}$ aryl group and a $C_{2-4}$ alkenyl group, and X is a halogen atom selected from the group consisting of chlorine, bromine and iodine.

2. The catalyst according to claim 1, which additionally contains an organoaluminum compound as a co-catalyst.

3. The catalyst according to claim 2, wherein the organoaluminum compound is a trialkylaluminum.

4. The catalyst according to claim 2, wherein the organoaluminum compound is at least one compound selected from the group consisting of trimethylaluminum, triethylaluminum, triisopropylaluminum, triisobutylaluminum, trihexylaluminum, trioctylaluminum, diethylaluminum chloride and ethylaluminum sesquichloride.

* * * * *